United States Patent [19]

Belmares

[11] Patent Number: 5,173,368
[45] Date of Patent: Dec. 22, 1992

[54] SOLUTION-APPLIED ANTIREFLECTIVE COATINGS

[75] Inventor: Hector Belmares, Petaluma, Calif.

[73] Assignee: Pilkington Visioncare Holdings, Inc., Menlo Park, Calif.

[21] Appl. No.: 244,204

[22] Filed: Sep. 14, 1988

[51] Int. Cl.$^5$ ............................................. B32B 17/06
[52] U.S. Cl. ..................................... 428/426; 428/212; 428/213; 428/412; 428/429; 428/446; 428/447; 428/448; 428/704; 428/913; 359/580; 359/581; 359/589
[58] Field of Search ................ 428/446, 447, 445, 429, 428/212, 220, 412, 502, 704, 213, 913, 426, 421; 350/164, 165, 166

[56] References Cited

U.S. PATENT DOCUMENTS

| | | | |
|---|---|---|---|
| 4,211,823 | 7/1980 | Suzuki et al. | 428/412 |
| 4,374,158 | 2/1983 | Taniguchi et al. | 427/164 |
| 4,505,679 | 9/1983 | Fujioka et al. | 428/216 |
| 4,556,605 | 12/1985 | Mogami et al. | 428/447 |
| 4,590,117 | 5/1986 | Taniguchi et al. | 428/212 |
| 4,687,707 | 8/1987 | Matsuo et al. | 428/448 |
| 4,765,729 | 8/1988 | Taniguchi | 428/502 |

FOREIGN PATENT DOCUMENTS

| | | |
|---|---|---|
| 1292717 | 10/1972 | United Kingdom . |
| 1406567 | 9/1975 | United Kingdom . |
| 1417779 | 12/1975 | United Kingdom . |

*Primary Examiner*—Ellis P. Robinson
*Assistant Examiner*—Archene A. Turner
*Attorney, Agent, or Firm*—Townsend and Townsend

[57] ABSTRACT

A three-layer antireflective coating composition for a CR-39 or glass substrate comprising a middle layer containing titanium compounds sandwiched between top and bottom layers containing polysiloxane, wherein the top and bottom layers are titanium-free; and a process for preparing said antireflective coating with improved adhesion on a CR-39 or glass substrate. The thicknesses of each of said coating layers is in accordance with preselected equations, and the refractive indices of said coating layers satisfy the following requirements:

$$n_m > n_b,$$

$$n_m > n_t,$$

and $$n_b \leq n_s$$

wherein $n_m$ is the refractive index of the middle layer, $n_b$ is the refractive index of the bottom layer, $n_t$ is the refractive index of the top layer, and $n_s$ is the refractive index of the CR-39 or glass substrate.

24 Claims, 2 Drawing Sheets

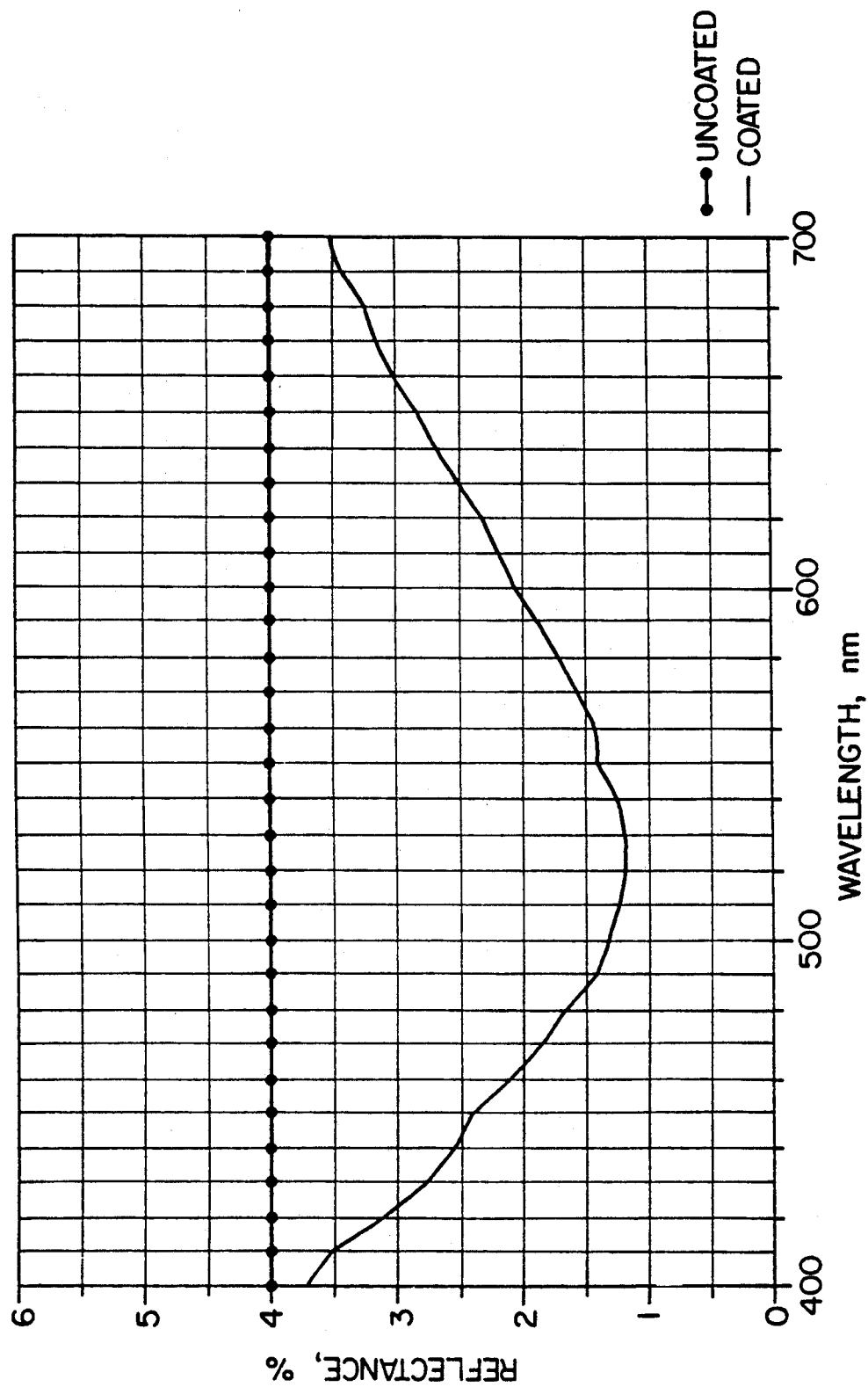
FIG._1.

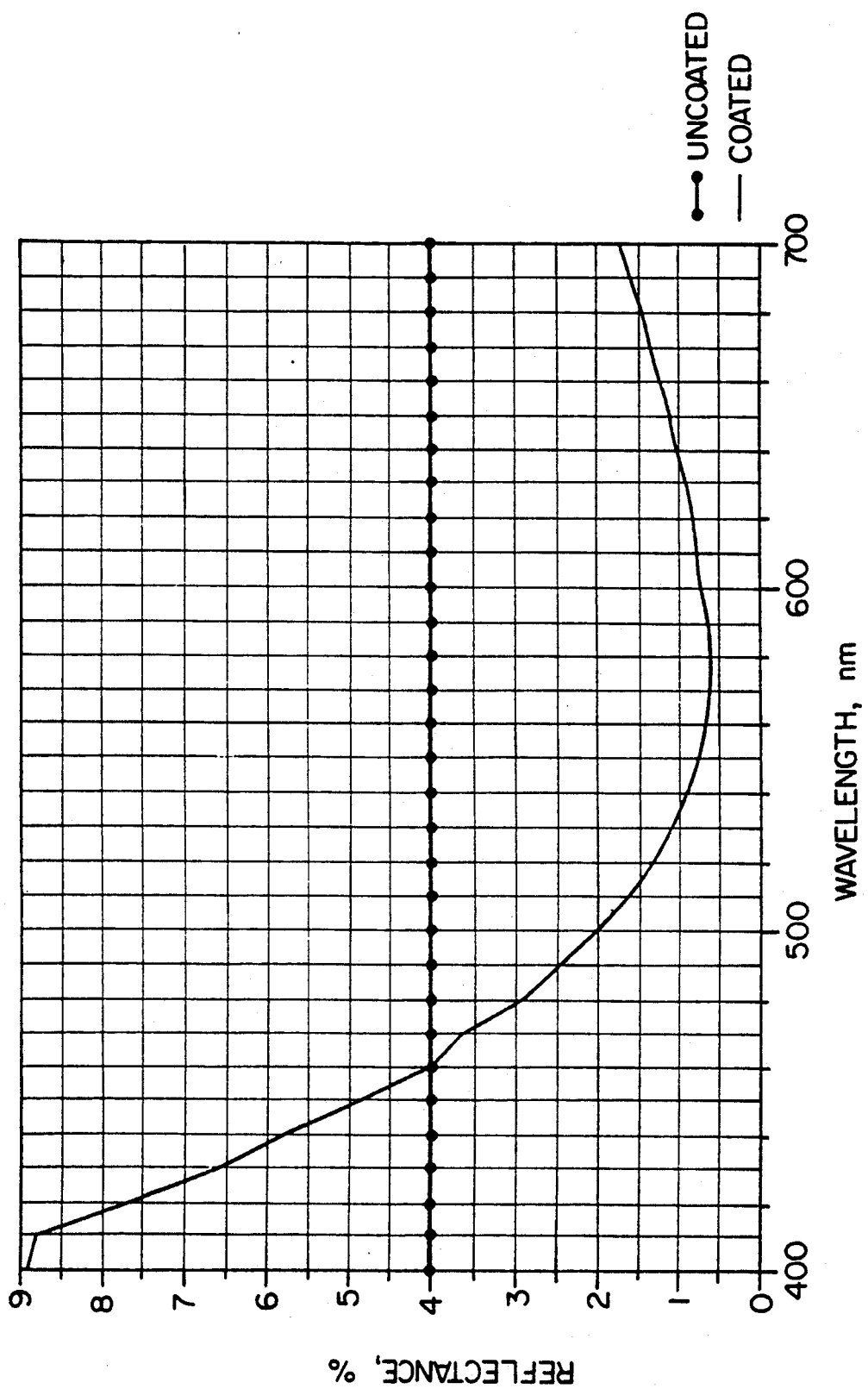
FIG._2.

SOLUTION-APPLIED ANTIREFLECTIVE COATINGS

BACKGROUND OF THE INVENTION

1. Field of the Invention

The present invention relates to a three-layer antireflective coating composition and process for producing the coating. The invention is excellent in durability, heat-, boiling water-, abrasion-, impact-, and ultraviolet light-resistance, and approaches a high degree of cosmetic uniformity. The antireflective coating has an excellent dyestuff permeability and is easy to clean. The antireflective coating can be applied to objects such as lenses, sheets, and rods and can be applied on a single face or both faces of a lens or a sheet. For each layer of the antireflective coating, the thickness is in accordance with a determined equation involving wavelength in air for oncoming light selected from a visible band.

2. Description of the Prior Art

When an object is viewed through a transparent material such as an optical plastic, if reflected light is intense, a reflected image called a "ghost" or "flare" is produced on the lens. This phenomenon has the result of producing an annoying and unpleasant feeling to the eyes.

A method to reduce reflected light is known. This method involves coating a substrate with a monolayer of film having a lower refractive index than the substrate. It is known that the selection of coating thickness of the material adjacent to the substrate is very important in order to obtain the beneficial reflection-preventive effect. For example, in the case of a monolayer coating film, when the optical thickness of the monolayer is adjusted to ¼ of the wavelength of the objective ray or an odd number of times thereof, a minimum reflectance and maximum transmittance is obtained. The term "optical thickness" is defined as the product of the refractive index of the coating layer times the thickness of the coating layer.

Formation of multilayer antireflective coatings with proposed selection of thicknesses is also known (see UK Patent 1,417,779, UK Patent 1,406,567, and UK Patent 1,292,717). However, such antireflective coatings are formed by vacuum evaporation deposition. This process poses the following problems in fields of application such as production of antireflective coatings on plastic substrates:

1. A high degree of vacuum results in restriction on the substrate size and type.
2. Manufacturing time is prolonged.
3. Heating to a certain temperature and for a certain length of time may cause distortion of the plastic substrate.
4. Inorganic oxides which are primarily used in layer-forming coating materials, yield reduced adhesion and heat resistance when applied to a plastic substrate. This is due to differences in thermal expansion (the difference in the coefficient of linear expansion between the coating film and the substrate).
5. Dyestuff permeability is completely lost.
6. Productivity is low and the production costs are high.

Other methods for producing antireflective coatings in which use of the vacuum evaporation deposition technique is not used have also been disclosed. These include a method in which a coating containing fine particles is formed (see U.S. Pat. No. 2,536,764) and a method in which an optical element of polymeric material is provided with a microstructured surface (see U.S. Pat. No. 4,114,983 and UK Patent 1,462,618). However, the light transmitted through the transparent material is also scattered, thus transmittance cannot be effectively improved. There is a known method in which a silicon coating is formed on a plastic substrate and then subjected to plasma polymerization to attain an antireflective effect (see U.S. Pat. No. 4,137,365). However, the dyestuff permeability is lost, the productivity is low, and the production cost is high.

An antireflective coating film having a dyestuff permeability, which is formed by treating an organic film containing inorganic fine particles with an activating gas (see U.S. Pat. No. 4,374,158) has been proposed and found to lack heat resistance and water resistance at high temperatures. There is also known an antireflective coating for a solar cell in which the substrate is covered with a liquid two-layer coating. $TiO_2$-$SiO_2$ (titanium dioxide-silicon dioxide)-forming compounds are used for the first layer and $SiO_2$ (silicon dioxide)-forming compounds are used for the second layer (see Applied Optics, Vol. 18, No. 18, pages 3133–3138). However, this antireflective coating film has no dyestuff permeability and is readily cracked or broken by thermal or mechanical deformation.

Preparation of ultra-thin monomolecular fluorinated siloxanes for antireflective coatings has been described. These films are useful to obtain a surface which is easy to clean, slippery, and protects the inorganic antireflective coating underneath (see JP Patent 61164676 and JP 62148902). However, application of this type of film coating requires an extra step in an already multistep operation. Thus, there is a significant increase in the manufacturing cost.

Moreover, methods to form antireflective films in solution have been described recently (see U.S. Pat. No. 4,590,117, EP Appl. 0119331, Jpn. Kokai Tokkyo Koho JP 59049502, JP 60068319, JP 59049960, and DE 3369568). However, the interface adhesion between the coatings is poor after boiling in water. The weather resistance is also poor and results in a severe loss of abrasion resistance over time. This is especially true for coatings with a high titanium dioxide ($TiO_2$) content. Fade-meter exposures of 20 hours (see U.S. Pat. No. 4,590,117, page 15, lines 2–5), were considered to be good measures of light resistance, even though the transmittance of the coated sheet did not change. The exposure time was relatively short for a stability test. These problems will be discussed in-depth in the following paragraphs.

Coating instability is manifested in wearing trials, when coatings applied to such substrates as glass or CR-39 lenses, become easily damaged and scratched after heavy exposure to sunlight. (The chemical name for CR-39 is allyl diglycol carbonate, and it is also referred to as optical plastic. Hereinafter, in the specification and in the claims, allyl diglycol carbonate will be designated by the term CR-39 substrate.) In addition, the coatings can wear off from the lens surface due to coating degradation and weakening of the coating surface. This weather sensitivity is due to the highly oxidant character of $TiO_2$ (in the high refractive index layer(s)) when it interacts with light.

The photooxidation of $TiO_2$ is well known. The following are examples: a) Photooxidation of binders such as alkyd paints through the formation of peroxy and hydroperoxy radicals (CA79(2):6859q); b) Photooxidation of polyethylene (CA100(24):193058q); c) Photooxidation of hydrocarbons (CA102(18):157786h); d) Photooxidation of waste waters loaded with organic material (CA90(22):174281r); e) Photooxidation of ornithine and putrescine (CA89(3):24751j); f) Photooxidation of water (CA(99(4): 28572f); g) Photooxidation of sulfur dioxide (CA101(16):140933k); h) Photooxidation of cyanide ion (CA(103(10):79294a; i) Photooxidation of ethylene (CA97(13):109378h); j) Photooxidation of alcohols (CA96(9):68081q); k) Photooxidation of olefins (CA95(22):192971y); l) Photooxidation of commercial polyethylene (CA87(12):85680r); etc.

Another undesirable feature in the above-mentioned patents is the use of an additional hydrolysis step to produce $TiO_2$ when forming the titanium containing layer. The mentioned patents incorporate an indiscriminate amount of silane monomers in the coating composition. In the present invention, it was determined that a restricted set of chemical compositions is needed to produce coatings that effectively satisfy the requirements mentioned and to produce a maximum transmittance with minimum reflectance. Also, prior patents have claimed two-and three-layer coatings. It was found that two-layer coatings applied to CR-39 lenses have very poor UV resistance, which becomes increasingly worse as the $TiO_2$ content of the layer adjacent to the substrate increases. We experimented without success with known antioxidants (Irganoxes) and/or UV stabilizers (hindered amines) to try to improve the poor UV resistance.

Additionally, we found that with two-layer coatings in which the first layer (adjacent to the CR-39 substrate) is composed of only $TiO_2$, the resistance to photooxidation and boiling water was poor. This is due to the fact that a pure $TiO_2$ layer has very poor adhesion when directly applied to CR-39 substrates, even when these substrates are etched with strong bases. Unlike the present invention, the three-layer coatings claimed in prior patents have a higher refractive index than CR-39 substrate for the bottom layer adjacent to the CR-39 substrate. In attaining this higher refractive index, titanium alkoxides are added to the bottom layer, as well as to the middle layer. Thus, two $TiO_2$ containing layers are stacked by a final top layer having a lower refractive index than the other two layers. This arrangement has the same poor UV resistance as the two-layer arrangement in which the layer adjacent to the CR-39 substrate contains $TiO_2$ and is stacked by a top layer having a lower refractive index than the bottom layer.

SUMMARY OF THE INVENTION

It is a primary object of the present invention to provide a three-layer antireflective coating composition for a CR-39 or glass substrate which is excellent in heat-, boiling water-, abrasion-, impact-, and ultraviolet light-resistance, and which has an improved adhesion, durability and dyestuff permeability.

Another object of the present invention is to provide a three-layer antireflective coating composition, wherein the thicknesses of each of three coating layers is in accordance with preselected equations, and the refractive indices of the coating layers satisfy the following requirements:

$n_m > n_b$, $n_m > n_t$, and $n_b \leq n_s$ wherein $n_m$ represents the refractive index of the middle layer, $n_b$ represents the refractive index of the bottom layer, $n_t$ represents the refractive index of the top layer, and $n_s$ represents the refractive index of the substrate. Customary coating methods may be adopted in order to control the coating thickness such as curtain flow coating, dip coating, roller coating and spin coating. We prefer spin coating.

A final object of the present invention is to provide a process for preparing a three-layer antireflective coating with improved adhesion on a CR-39 or glass substrate. The presence of fluorosurfactants in an effective amount in the caustic solution used for etching the substrate, in each coating layer solution, and in each cured coating is preferably incorporated for an antireflective coating that is excellent in adhesion and durability.

More specifically, in accordance with the present invention, there is provided a three-layer antireflective coating composition for a CR-39 or glass substrate, comprising a middle layer containing titanium compound sandwiched between top and bottom layers containing polysiloxane, wherein the top and bottom layers are titanium-free.

Neither $TiO_2$ nor its precursor alkoxides are incorporated into the layer adjacent to the CR-39 substrate (see U.S. Pat. No. 4,950,117). Instead, the adjacent layer preferably contains only polysiloxane resins, colloidal silica, organic dicarboxylic acid and surfactants. This improved three-layer antireflective coating composition is resistant to boiling water and during tinting by dispersion dyes in boiling water. For this improved coating arrangement and composition, selected chemical compositions in the correct proportions by weight may be used to obtain the most favorable properties in accordance with the present invention. Some of the compositions claimed in the mentioned patents produce a yellow discoloration when the coatings are cured or undergo a weathering test. No such discoloration occurs using the three-layer coating arrangement and selected compositions in the present invention.

BRIEF DESCRIPTION OF THE DRAWINGS

FIG. 1 is a graph comparing the reflective photospectrum of an uncoated lens and an antireflective coated lens exhibiting a golden-pink reflected color.

FIG. 2 is a graph comparing the reflective photospectrum of an uncoated lens and an antireflective coated lens exhibiting a purple-pink reflected color.

DETAILED DESCRIPTION OF THE PREFERRED EMBODIMENTS

Photooxidation by titanium dioxide ($TiO_2$) occurs upon interaction with light. To decrease the severe photooxidative degradation by $TiO_2$, the titanium-containing layer must be sandwiched between two polysiloxane-containing layers to obtain a three-layer coating. With this arrangement, the middle layer can contain almost purely $TiO_2$. However, it is preferred that the solution that will form middle layer contain an amount of polysiloxane resin in a solid weight ratio to organic titanium compounds (described below) used as precursors of $TiO_2$. The polysiloxane resin binds the $TiO_2$ in the middle layer, improves the boiling water resistance of the three-layer coating, improves the uniformity of the coating thickness and increases the stability of the coating solution. The coating solution is used to form the layer before it is cured, and the various components comprising the coating solution will be discussed in detail further in the specification. The increased stability of the coating solution is due to the stabilizing ability of the polysiloxane resin. When organic titanium compounds such as tetraisopropyl titanate (TPT) become hydrolyzed by absorption of moisture from the air, the available functional groups on the polysiloxane resin attach to the $TiO_2$ colloids, thus avoiding clumping of the layer. The polysiloxane functional groups thus prevent coating contamination by visible particles of the dioxide. This is important for the production of good quality coatings.

The polysiloxane resins in the middle layer should preferably have a refractive index that does not lower unduly the refractive index of the $TiO_2$. In the present invention, the polysiloxane resins are comprised of at least two siloxane monomers in a ratio by weight based on the weight of the combined silane monomer mixture. In turn, the resulting polysiloxane resins in the middle layer should preferably be in a ratio (described below) to the organic titanium by weight of the combined polysiloxane/titanium compound. A small weight percent of fluorosurfactant is also contained in the solution and in the final cured coating of the middle layer, and will be discussed further in the specification. However, the ratio of polysiloxane resin to organic titanium in the middle layer is important and select ranges should be used for each component to achieve the best results.

In determining which siloxane monomers worked most effectively as precursors of polysiloxanes, it was found that combinations of phenyltrialkoxysilane (such as phenyltrimethoxysilane) and gamma-glycidoxypropyltrialkoxysilane (such as gamma-glycidoxypropyltrimethoxysilane) after forming the respective polysiloxane were highly resistant to photooxidation by $TiO_2$, particularly when the proportion of $TiO_2$ in the coating was above 50 percent by weight of the cured coating layer-forming components. Obviously, these polysiloxane compositions can be used with lower levels of the metal oxide as well. Thus, an organic titanium compound comprising from about 1-99.8% by weight based on the weight of the titanium compound/polymer mixture (polysiloxane) can be used in the present invention.

The phenylsilane derivative (phenyltrialkoxysilane) contains a phenyl ring, which acts to raise the refractive index of the polysiloxane resins.

The phenylsilane derivative is also a stable molecule towards photooxidation (analogously, silicon oils derived from phenyl compounds are extremely stable towards thermal degradation). An excess of the phenyl compound would impair the adhesion properties of the coating. On the other hand, an excess of the gamma-glycidoxy compound, although promoting adhesion, would make the siloxane binder very susceptible to photooxidation due to the already high oxygen content in the molecule of the monomer. Thus, the range for phenyltrialkoxysilane monomer that resulted in the best adhesion properties was determined to be from about 20-60% by weight of the combined silane monomer mixture and preferably from about 30-40% by weight of the combined silane monomer mixture. The range determined for the other monomer in the combination, gamma-glycidoxytrimethoxy monomer, was from about 40-80% by weight of the combined silane monomer mixture and preferably 60-70% by weight of the combined silane monomer mixture.

However, in order for the antireflective coating composition to be effective, the middle layer (high refractive index layer) with the component ranges given must be sandwiched between titanium-free top and bottom layers.

Two-layer coatings are easily photodegraded and may result in almost total loss of abrasion resistance. Even with a ratio of siloxane resins to $TiO_2$ or 100% $TiO_2$ in the high refractive index layer, the two-layer coatings experience a faster degradation of the siloxane resins when there is a higher proportion of $TiO_2$.

By selecting an organic titanium compound that hydrolyzes rapidly in water, the present coating invention does not need a special second treatment to undergo hydrolysis. This saves time and cost of production. We selected organic titanium compounds such as tetraisopropyl titanate (TPT) or tetraethoxytitanate (TET), instead of higher titanates, such as tetrabutyl titanate (TBT) (see EP 0119,331). These lower organic titanium compounds hydrolyze rapidly in air as well as in the water produced by siloxane polymerization which occurs during curing. Several prior art patents utilize an additional hydrolysis step. (See U.S. Pat. No. 4,590,117 and EP Patent No. 0119,331). Also, no additional step is necessary in which the coated material is subjected to an atmosphere with absolute humidity (6–180 g/kg-air) for at least 1 second and then cured at elevated temperatures (JP Patent 61091601). Thus, the present invention can be produced efficiently, yielding a high resistance and a high transparency.

The proportion of TPT/siloxane hydrolysis product (in which the weight of the product is based on the weight of the solid equivalent weight) is also important. For a two-layer coating, if the siloxane component is present in a low amount, then the adhesion with the top layer and with the CR-39 substrate are poor when tested with boiling water. For the three-layer coating composition of the present invention, the adhesion when tested with boiling water is much improved. No lower solid weight limit for the TPT content was set. However, it was found that the lower the TPT content of the middle layer, the lower the refractive index of the middle layer, and this resulted in corresponding loss of antireflective properties for the coated substrate. The ranges at which the ratio of TPT/siloxane hydrolysis product produced the maximum antireflective properties were determined based on the combined weight of the TPT/siloxane. The range for TPT was determined to be from about 1-99.8% by weight with a preferred range of from about 74-82% by weight. The range for siloxane was determined to be from about 0.2-99% by weight with a preferred range from about 18-26% by weight.

A refractive index equation (A) involving the middle layer of the present invention was determined by regression analysis. The selected composition of the middle layer was comprised of a polysiloxane resin made from a monomer mixture consisting of 43% phenyltrimethoxysilane and 57% gamma-glycidoxypropyltrimethoxy silane, in any proportion to TPT by weight, the latter giving $TiO_2$ by hydrolysis. The equation is as follows:

$$\text{ref. index (Sodium line)} = (0.00361)(\% \, TiO_2) + 1.5181 \quad (A)$$

The equation shows the relationship between the refractive index of the solid content equivalent weight for the 47/53 silane monomer ratio, with varied proportions by weight of $TiO_2$. The solid content equivalent weight referred to herein means the amount equivalent to the formula weight corresponding to the silane hydrolysis product $R\text{-}SiO_{1.5}$. For example, in the case of phenyltrimethoxysilane $[C_6H_5Si(OCH_3)_3$: molecular weight$=198]$, the solid equivalent weight of 1 gram of this compound is the amount corresponding to $C_6H_5SiO_{1.5}$ (formula weight$=129$), that is, $0.652$ g ($=129/198$). For methyltrimethoxysilane, the solid equivalent weight of 1 g of this compound is 0.493 g. Additionally, 1 g of TPT gives 0.279 g of $TiO_2$. Thus, the percent of $TiO_2$ can be calculated from the mixture of both $TiO_2$ and the solid content equivalent weight of the siloxane polymer.

The correlation coefficient was found to be 0.999, practically 1.0. By extrapolation, 100% $TiO_2$ would have a refractive index of 1.88. This value is close to the value obtained by hydrolysis of TPT with simultaneous vapor deposition at low temperatures (150° C.). These films are amorphous, have a refractive index of 2.0, and are of a uniform thickness. Annealing in air at 350° C. converts the film to the anatase tetragonal crystallization form. At 1000° C. the film is completely rutile with a refractive index of 2.5 (cf CA75(6):41458x; from a 1971 publication). From these experiments, it was shown that $TiO_2$ results from hydrolysis in the middle coating layer. Slight differences in porosity and errors in extrapolation account for the differences in refractive index. The existence of differences in porosity can be shown. For example, amorphous $TiO_2$ thin films deposited by electron-beam-evaporation below 120° C. substrate temperature had a refractive index of 2.15(cf CA86(20):148009f from a 1976 publication). Looking back to equation (A), at 0% $TiO_2$ the refractive index of the resin from the equation is 1.5180, which corresponds to the real value of the siloxane resin alone. Notice that this value is higher than the value for the CR-39 substrate which is 1.5002. This is due to the presence of phenylsilane derivative in the resin which acts to raise the refractive index. Otherwise, the refractive index of the base siloxane resin would be below 1.5002.

The composition of the top and bottom layers is also critical to obtain optimum durability and resistance of the antireflective coating. It is important to have good boiling water resistance. The boiling water test usually consists of running a standard cross-hatch adhesion test by cutting the surface of the coating to make 100 squares submerging the coated lens for one hour in boiling water, and counting the number of squares peeled off. This test is important because many times the tinting process can last for as long as one hour in boiling water. If the lens coating peels off at this stage, then the lens coating will eventually fail in actual use.

The top and bottom layers are of lower refractive index than the middle layer so as to provide optimum antireflective properties to the surface. The top and bottom top and bottom layers require UV stability. Otherwise, the layers will degrade under weathering: due to the photooxidation by the $TiO_2$ in the middle layer. The top and bottom layers need to adhere well to the middle layer and additionally, the bottom layer needs to adhere well to the glass or CR-39 substrate. It was determined that the top and bottom layers must contain a monomer that after being transformed to a polysiloxane promotes adhesion. One such monomer is of the type of highly oxygenated (epoxy and ether) gamma-glycidoxypropyltrialkoxy silanes mentioned previously. Another monomer is also needed to stabilize the polysiloxane resin, to decrease photooxidation, and to lower the refractive index of the top and bottom layers. This second monomer is of the type of alkyltrialkoxysilanes such as methyltrimethoxysilane. Too much of the alkyltrialkoxysilanes will impair adhesion and too little will impair UV stability of the layers.

Thus, the optimum range of each monomer was determined so as to produce the best adhesive properties. The generally acceptable range of methyltrimethoxysilane was determined to be from about 30–55% by weight of the silane monomer mixture and the preferable range was from about 38–48% by weight. The generally acceptable range of gamma-glycidoxypropyltrimethoxy silane was determined to be from about 45–70% by weight of the silane monomer mixture, and the preferable range was from about 52–62% by weight.

The present invention also provides for preselected equations relating to the thickness of the coating layers and the refractive indices of the substrate and each of the coating layers.

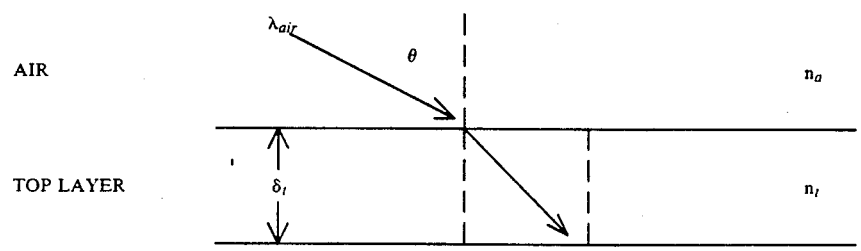

CHART 1

CHART 1 -continued

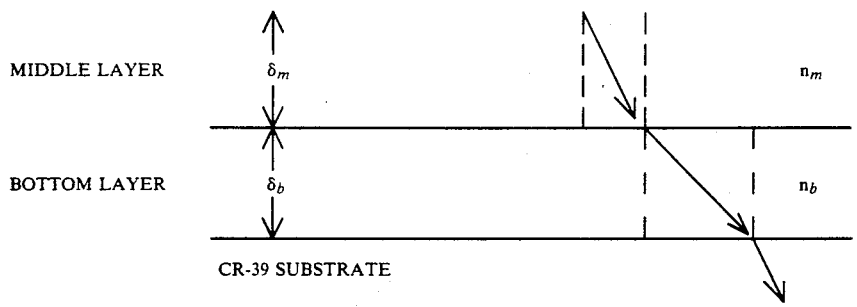

CR-39 SUBSTRATE

Chart 1 shows the basic diagram of the antireflective coating and the symbol representations for the equations. Thickness in nanometers is represented by $\delta$, refractive index by n, wavelength in air for oncoming light by $\lambda$, and angle of incidence by $\theta$. U.S. Pat. No. 4,590,117 and related prior patents claim and give examples for the relationship $n_b > n_s$ for three-layer coatings. In those examples, $n_b$ represents the refractive index of the bottom layer and $n_s$ represents the refractive index for the substrate. The substrate in the present invention is CR-39. In order for the antireflective coating to be most effective, titanium compounds are not incorporated into the bottom layer of the three-layer coating and, the refractive index of the bottom layer is less than or equal to the refractive index of the substrate. The relationship of $n_b > n_s$ is essential to the present invention, where $n_b$ represents the refractive index of the bottom layer and $n_s$ represents the refractive index of the substrate. In addition, the following refractive index relationships are necessary for optimum antireflective properties:

$n_m > n_b$, $n_m > n_t$, and preferably $n_m > n_s > n_b \geq n_t$ where $n_m$ represents the refractive index of the middle layer and $n_t$ represents the refractive index of the top layer. For these refractive index relationships, equations (1) through (3) were derived:

$$\delta_t = \frac{L * \lambda_a}{4n_a(n_t^2 - \sin^2\theta)^{\frac{1}{2}}} \quad (1)$$

$$\delta_m = \frac{M * \lambda_a}{2n_t(n_m^2 - \sin^2\theta)^{\frac{1}{2}}} \quad (2)$$

$$\delta_b = \frac{M * \lambda_a}{2n_m(n_b^2 - \sin^2\theta)^{\frac{1}{2}}} \quad (3)$$

The angular dependence of the incident light must be taken into account in such a way that the reflections at the interface of the air continuum to top layer, top layer to middle layer, and middle layer to bottom layer is 180° out of phase with the reflections at the interface of the top layer to middle layer, middle layer to bottom layer, and bottom layer to substrate, respectively. The value that each coating layer thickness should have depends on the arrangement and composition of the layers. Equations (1) and (2) also apply for two-layer coatings, since $n_m > n_t$. In equation (1), L is an odd positive integer because even positive integers would cause more of a reflection which is not desirable. In equations (2) and (3), M is any positive integer. It should be noted that in U.S. Pat. No. 4,590,117, the relationship of the refractive indices for a three-layer coating is different from the relationship for the three-layer coating in the present invention. In the '117 patent, the relationship is such that $n_m > n_b > n_s > n_t$, whereas in the present invention, the relationship is $n_m > n_s > n_b \geq n_t$. This is due to the fact that there are no titanium compounds incorporated into the bottom layer adjacent to the substrate in the present invention. The titanium compounds are only incorporated into the middle layer.

In obtaining the previously stated equations, it must be considered whether the beam of light suffers an internal or an external reflection. The internal reflection is obtained when a given layer has a higher refractive index than the layer below it. The wave suffers an 180° phase displacement due to the internal reflection in the high refractive index layer. Equation (2) shows the relationship obtained with this type of reflection. External reflection occurs when a given layer has a lower refractive index than the layer below it. Here, the wave does not suffer any phase displacement. Equations (1) and (3) apply to this type of reflection. In equation (3), even though the respective layer has an external reflection, the coefficient in the denominator is $\frac{1}{2}$. This accommodates the phase inversion that the internal reflection causes in the high refractive index middle layer. As mentioned previously, equation (3) was derived to obtain phase interference between the reflected light of the middle layer and the reflected light of the bottom layer. For any equation, when $\theta = 0$, that is, for a beam of light perpendicular to the surface of the substrate, equations (1) through (3) become equations (1') through (3').

$$\delta_t n_t = \frac{L * \lambda_a}{4n_a} \; ; n_a = 1.0000 \quad (1')$$

$$\delta_m n_m = \frac{M * \lambda_a}{2n_t} \quad (2')$$

$$\delta_b n_b = \frac{M * \lambda_a}{2n_m} \quad (3')$$

The optical thickness $\delta_q n_q$, in which q=t,m,b, can be obtained through rearrangement of the equations when $\theta = 0$. Notice that $\lambda_a$ (wavelength of light in air) in every equation is divided by the refractive index of the previous layer of the light path. Thus, the optical thickness of each layer is completely different as to the way it is described in U.S. Pat. No. 4,590,117 and related prior patents which use the term $\lambda/4$ or multiples of it for the optical thickness of any layer of two- and three-layer coatings. Notice also that equation (2') has $\frac{1}{2}$ as the coefficient instead of the $\frac{1}{4}$ used in the mentioned patents. Thus, thicknesses of each coating layer can be defined by equations (1) through (3) and (1') through (3') for the three-layer antireflective coating provided. Different or equal wavelengths of visible light can be chosen to determine the appropriate thickness for each layer. Customary coating methods may be adopted, but in order to control the coating thickness of the coating layer, curtain flow coating, dip coating, roller coating and spin coating methods can be used. We prefer spin coating.

A final object of the present invention is to provide a process for preparing a three-layer antireflective coating with improved adhesion on a CR-39 or glass substrate. The first step is to prepare the CR-39 or glass substrate for adhesion by the bottom layer. This is accomplished by etching the substrate with a caustic solution comprising a strong base, such as potassium hydroxide (KOH) or sodium hydroxide (NaOH) (the etching mechanism on CR-39 substrates was published in 1980; cf. CA93:115303p). The effective concentration of caustic for etching should contain either potassium or sodium hydroxide in the range from about 10 to 40% by weight of the caustic solution and most preferably from about 25 to 35% by weight of the caustic solution. The use of potassium hydroxide is preferred. (An effective concentration or amount, as the term is used here and hereinafter in the specification and claims, is the concentration or amount sufficient to bring about the best overall antireflective properties.) U.S. Pat. No. 4,611,892 (1986) claims solutions of caustic between 0.1 to 30% by weight in aqueous polyethyleneglycol or in water with an anionic or non-ionic surfactant. (The surfactant being in a range of from 0.01 to 5%). This patent claims that etching high refractive index lenses, containing some CR-39, with this caustic solution, brings good adhesion of a cured siloxane coating to the lens. Surfactant concentrations below 0.01% by weight were not within acceptable limits because lens surface washability was reduced. Concentrations of caustic above 30% by weight were excluded because the viscosity of the aqueous solution increased to a point where the solution became unsuitable for chemically treating the surface of the lens.

By adding an effective amount of at least one fluorosurfactant (a fluorinated surfactant) in the caustic solution, concentrations of surfactant below 0.01% by weight could be used. Thus, the present invention is novel in the use of fluorosurfactants in a lower amount as opposed to the use of other types of surfactants that need to be added in a greater amount.

Fluorosurfactants are preferable to other types of surfactants because the presence of carbon-fluorine bonds cause the fluorosurfactant to be more resistant to caustic.

It was found that two types of fluorosurfactants could be used for the purposes of the present invention, that is, in the etching step and the later discussed coating steps. Both fluorosurfactants (or also referred to as fluorochemical surfactants) excel in wetting action and chemical and thermal stability. One such fluorosurfactant that can be effectively used in the present invention is Zonyl FSN made by DuPont Co. (40% in isopropanol or 100%). This particular fluorosurfactant is a molecule consisting of two moieties. The first moiety repels water and is comprised of a completely fluorinated hydrocarbon from 3-8 carbons. The second moiety attracts water and is comprised of polyethylene glycol. The formula for Zonyl FSN is as follows:

where $R_F = F(CF_2 CF_2)_{3-8}$.

The other fluorosurfactant that can be effectively used in the present invention is Fluorad, FC-170C made by 3M Co. It acts similarly to Zonyl FSN, and like Zonyl FSN is nonionic. FC-170C is a fluorinated alkyl polyoxyethylene ethanol but is unlike Zonyl FSN in that it is not completely fluorinated. Although both fluorosurfactants mentioned can be used, Zonyl FSN is preferred.

Since the surface tension of the caustic solution practically arrives at a minimum around 0.001%, a concentration of fluorosurfactant below 0.01% by weight of the caustic solution could be used to obtain optimum results in etching the substrate. Thus, at 25° C., a 10% aqueous solution of potassium hydroxide with 0.001, 0.01, and 0.1% surfactant has a surface tension of 30, 25, and 23 dynes/cm, respectively (Zonyl fluorosurfactants, Product Information Bulletin, DuPont).

Thus in accordance with the present invention for the process for preparing an antireflective coating, the aqueous caustic solution used in etching the substrate should contain an effective amount of fluorosurfactant. The effective amount of fluorosurfactant should be in a range from about 0.0001%-5% by weight of the aqueous caustic solution. The upper limit of fluorosurfactant depends on the solubility extremes of Zonyl FSN in a high concentration of caustic. The concentration of fluorosurfactant should preferably be from about 0.03 to 0.15% by weight. Fluorad FC-170C can also be used. Caustic concentrations of 30% by weight or higher can also be used without negative effects. The most preferred caustic concentration is from about 25-35% by weight.

Because selected caustic concentrations are used, etching time can be reduced to as little as 30 seconds, although 60 to 85 sec is preferred. Typically, U.S. Pat. No. 4,611,892 reports 3 to 5 minute etching times in their examples. Obviously, the productivity and quality of the product increases greatly with the reduction in etching time. In addition, Zonyl FSN is very resistant to the chemical degradation caused by the caustic upon a surfactant. This is important when higher concentrations of caustic are used in combination with relatively high temperatures (30°-50° C.) to increase the speed of etching.

Also, in order to obtain an acceptable tintability rate for the coated substrate, an additive that promotes dye absorption without impairing any of the other effective properties of the coating is needed. Organic dicarboxylic acids, such as maleic acid, fulfill this function, and can be added to the top and bottom layers. If maleic acid is added to the middle layer though, the boiling water adhesion of the composition is decreased somewhat. Therefore, it is preferred to add the diacid to only the top and bottom layers to obtain optimum tintability. Another dicarboxylic acid which can be used is sebacic acid, but maleic acid is preferred because of its high solubility in organic solvents, such as the cellosolves. Dicarboxylic acids such as sebacic acid have been claimed to obtain tintable siloxane coatings for one-layer, thick-anti-scratch coatings (see JP82 67666, Jpn. Kokai Tokkyo Koho), but not for three-layer antireflective coatings. The amount of dicarboxylic acid that should be added to bring about sufficient tintability was determined to be from about 1-25% by weight based on the weight of the cured coating layer forming components, and preferably from about 3-10% by weight. Large amounts of the dicarboxylic acid tend to decrease the abrasion resistance of the cured coating. The maleic acid in combination with fluorosurfactants also acts, in a synergistic action, to increase the resistance to photooxidation at the interface of the middle layer and the two adjacent layers. Thus, shifting of the wavelength of reflected light that occurs after severe photooxidation, is reduced. In addition, abrasion resistance of the exposed coating is preserved. The increased resistance to photooxidation is produced by chelation of the titanium compound at the interface of the layers. The coating are thus stabilized. Also, the chelating properties of the maleic acid help to increase the adhesion between the layers. Chelating compounds such as beta-diketones and/or beta-ketoesters added to the siloxane layer have been claimed to impart water resistance (not boiling water resistance) and an antireflective coating layer composed of inorganic substances placed over a cured siloxane layer containing at least one species of the beta-diketone or beta-ketoester has been described (JP 62121402). It is well known that inorganic coatings on top of organic substrates have very poor boiling water resistance (at most, a few seconds). When the two beta-compounds as substitutes for maleic acid were tested with the compositions of the present invention, none of the previous beneficial effects with maleic acid were observed. The maleic acid is also a polymerization catalyst for siloxanes and for epoxides, thus improving and accelerating the coating crosslinking efficiency. This catalytic action brings about stabilized abrasion resistance, increased weathering resistance, and high productivity. However, if the catalyst is used in excess, it will tend to have a plasticizing effect. Thus, low levels of maleic acid are preferred.

The top and bottom layers also incorporate colloidal silica to increase the abrasion resistance of the coatings. The particle size of the colloidal silica may be from about 1 to 150 nanometers but preferably from about 15 to 30 nanometers. The colloidal suspension may be in water, any of the cellosolves, alcohols or any other organic solvent, although cellosolve preparations are preferred. The relative proportion of colloidal silica must be such as to allow the organic silicon compound or the hydrolyzed product thereof, to be contained in an amount, of at least 20% by weight based on the weight of the cured coating layer-forming components. If the solid content equivalent weight of the organic silicon compound or the hydrolyzed product thereof, is smaller than 20% for the top and bottom layers, such properties as adhesion, surface hardness, and durability are decreased. A preferred range of organic silicon compound from about 45 to 75% by weight should be added.

A refractive index equation (B), involving the top and bottom layers of the present invention was determined by regression analysis. The selected composition for either top or bottom layer used, comprised a polysiloxane resin consisting of 43% methyltrimethoxysilane and 57% gamma-glycidoxypropyltrimethoxy silane in any proportion to SiO$_2$ (silicon dioxide). The percentage of silica is based on the solid content equivalent weight of the organic silanes. The equation is as follows:

$$\text{ref. index (Sodium line)} = (-0.0002635)(\%SiO_2) + 1.4772 \quad (B).$$

The correlation coefficient was 0.97. By extrapolation, 100% SiO$_2$ would have a refractive index of 1.4509, which is equivalent to the value obtained by vacuum deposition of silica (1.450). At 0% of SiO$_2$ the calculated refractive index is 1.4772 which corresponds to the refractive index of the cured siloxane resin. This refractive index is lower than the value for CR-39 substrates (1.5002) and is typical of siloxane resins that do not contain phenylsilane compounds or any other aromatic rings.

In addition to flow additives which are commonly used in coating technology, surfactants are also needed to obtain a uniform coating thickness and provide a good wetting of the previous surface. This is important if high yields of defect-free products are to be obtained and interface adhesion is to be improved. An effective amount of surfactant must be added to each coating layer to bring about optimum results. The type of surfactant chosen for the present invention is a fluorosurfactant of the type previously discussed—Zonyl FSN or Fluorad 170C. Thus, at least one fluorosurfactant should be added to each coating solution and will be present in the final cured coating layer. The surface tension of the coating solution is usually different from the surface tension of the cured coating. Any adjustments made to a solution might bring unexpected results in the cured coating because the fluorosurfactants are usually nonvolatile. Therefore, the proportion of fluorosurfactants is higher in the cured coating than in the corresponding coating solution. Normally, siloxanes are made in polar solvents with aqueous acid added as a catalyst. However, the cured siloxane resins, the colloidal silica, and titanium compounds are hard to wet by the coating solutions and have a relatively low surface tension. It was found that the only way to compatibilize a cured coating with a relatively polar siloxane resin solution or a titanium compound solution (with some siloxane resin) was to use a powerful fluorosurfactant to practically bring down the surface tension of the solutions to the level of the cured coatings. This ensures that the coating solution will spread uniformly on the surface of the previous coating and that the coatings will be compatible with each other.

Thus, in principle, with the use of various concentrations of fluorosurfactant in the coating solutions, all the coating layers and solutions are of approximately the same surface tension. To do this, the flurosurfactant must be in a concentration such that, if a graph is drawn out comparing tension vs. concentration, the curve of the fluorosurfactant plotted must be relatively flat. This better ensures that the cured coating with a relatively high amount of surfactant will have approximately the same surface tension as the next solution to be applied, the latter having a lower surfactant concentration than the cured coating. Again, the fluorosurfactant Zonyl FSN meets these requirements in acid, neutral or basic solutions. Even for aqueous 70% nitric acid, the surface tension at 0.001, 0.01 and 0.1% are the same (30, 25, 23 dynes/cm respectively) as for aqueous 10% potassium hydroxide, deionized water, or aqueous 25% sulfuric acid at the same surfactant concentrations. Notice the flatness of the curve of surface tension vs. concentration of surfactant for each one of the aqueous solutions regardless of the pH of the solutions.

In preparing the bottom layer (adjacent to the etched CR-39 substrate), the etched CR-39 substrate is dipped in a coating solution containing at least one fluorosurfactant from about 0.0001–0.006% by weight of the coating solution-forming components and preferably from about 0.001–0.003% by weight. After the bottom layer is formed by spinning and cured, the corresponding fluorosurfactant should comprise from about 0.0015–0.09% by weight of the cured coating layer-forming components, and preferably from about 0.022–0.044% by weight.

In preparing the middle layer, the previous one-layer substrate is dipped in a coating solution containing at least one fluorosurfactant from about 0.0001–0.012% by weight of the coating solution-forming components, and preferably from about 0.0001–0.0017% by weight. After the middle layer is formed by spinning and cured, the corresponding fluorosurfactant should comprise from about 0.03–0.55% by weight of the cured coating layer-forming components, and preferably from about 0.03–0.08% by weight.

Finally, in preparing the top layer, the previous two-layer substrate is dipped in a coating solution containing at least one fluorosurfactant from about 0.0001–0.28% by weight of the coating solution-forming components, and preferably from about 0.10–0.17% by weight. After the top layer is formed by spinning and cured, the corresponding fluorosurfactant should comprise from about 0.001–4.0% by weight of the cured coating layer forming components, and preferably from about 1.5–2.49% by weight. Any higher level of surfactant for the top layer brings about a decrease in abrasion resistance due to the plasticizing effect of the surfactant.

For the purpose of providing smooth coatings, a flow control agent made of a block copolymer of an alkylene oxide and a silicon resin such as, SF1188 (made by General Electric), may be incorporated into the coating composition of each layer. The amount of flow control agent to be added need not be very large to manifest its effect, and generally, the amount added ranges from about 0.01 to 1.0% by weight of the coating solution-forming components for each layer. Most preferably the flow additive should be in the range from about 0.08 to 0.15% by weight.

The use of a curing catalyst results in a coating composition having a long pot life, rigidifying quickly at a relatively low temperature, and exhibiting satisfactory adhesiveness to CR-39 substrates. A variety of Bronsted acids or Lewis acids are known to be curing catalysts for siloxane resins and for epoxy group-containing siloxane resins. The Bronsted acids include latent catalytic acids such as ammonium perchlorate, ammonium chloride, ammonium sulphate, etc. (GB Patent Application 2 137 648) and other acids such as perchloric acid, paratoluenesulfonic acid, etc. The Lewis acids include aluminum acetylacetonate, and many other metal acetylacetonates (U.S. Pat. No. 4,590,117 and U.S. Pat. No. 4,211,823), as well as $SnCl_4$, $ZnCl_4$, etc. The Bronsted acids either act too fast (for example, perchloric acid), with the consequent reduction in pot life for siloxane solutions, or in the case of latent Bronsted acids, they act too slowly in opening the epoxy group (ammonium perchlorate, etc.). However, Bronsted acids are good adhesion promoters to the substrates. The property of good adhesion to substrates is described in GB Patent 2 137 648. This patent also describes coatings containing aluminum acetylacetonate that tend to exhibit poor surface rigidity and poor adhesiveness to substrates (page 4, lines 70–73). However, it is known that Lewis acids such as aluminum acetylacetonate are very good catalysts for epoxy opening.

It was found in the present invention that a combination of latent catalysts, such as ammonium perchlorate or other latent Bronsted acids mentioned previously, when combined with Lewis acids, such as aluminum acetylacetonate provided synergistic, fast, and efficient curing of siloxane resins. These siloxane resins contained epoxy groups, such as the ones described previously, including gamma-glycidoxypropyltrialkoxy silanes. These silanes are present in the bottom and top layers of the present invention, and do not impair adhesion or coating stability. As for the middle layer, incorporation of these two synergistic catalysts is not determinant when the $TiO_2$ content in the layer is 50% or higher, because the precursors, the titanium alkoxides, are also catalysts for both siloxane and epoxide polymerizations. However, for any other $TiO_2$ content, it is preferred to have the other two catalysts. The curing is fast, so as to allow the coatings to cure to a tack-free state right after they are formed. This is accomplished through application of 30 to 60 sec of heat in a simple electrical coil-heated station, all in a continuous process. The process prevents the coating from acquiring flying air particles and dust and allows the handling of the lens without damage to the coating. This catalyst induced extra-fast curing applies to relatively thin coatings (less than 200 nanometers, 0.2 microns) and to relatively thick coatings (more than 200 nanometers). If only ammonium perchlorate or aluminum acetylacetonate is used, the extra-fast curing is not obtained and the coating is tacky or very fluid under the same heating conditions. The extra-fast curing is very important for any type of coating, but particularly for antireflective coatings because the coatings are very thin.

After the initial curing, the coating can be postcured to any desired degree, and in fact, each time a coating is applied, the coating is postcured by hot air at a temperature not less than 70° C. and preferably about 100° C. for a period of from about 20 minutes to 5 hours, preferably about 4 hours. Alternatively, the coating can be exposed to infrared radiation or to any other radiation that will thermally postcure the coating to completion. If the individual layers are not postcured at a high degree, the following layer will interpenetrate the previous layer, and the antireflective properties of the final product will be decreased considerably.

Certain solvents are effective for stabilizing the liquid coating compositions. For example, monoalkyl ethers of ethylene glycol or diethylene glycol, alcohols having up to 8 carbon atoms, diketones such as acetylacetone, and ketoesters such as ethyl acetoacetate are especially effective in stabilizing alkoxides, chelate compounds of titanium, and siloxane resins. Solvents such as monoethyl ether or monopropyl ether of ethylene glycol are preferred.

The coating of a glass or CR-39 substrate with each coating layer may be accomplished by any known method, such as the immersion method, the spray method, the roller coating method, the spinning method, etc. However, the spinning method is preferred.

The properties of the coatings are discussed in the following examples, and have been individually monitored.

Abrasion Resistance: There are two tests for abrasion resistance. The first test is the Taber abrasion resistance test. Calibrase abrading wheels CS-10F profiled to the curved surface of the lens were used under a load of 500 g, and the haze readings at different number of cycles were recorded. This test method is a modification of the corresponding ASTM D 1044-82. The second test is the steel wool test performed by rubbing the surface with steel wool #0000. This property was rated on the following scale.

A—No scratches sustained with rubbing.
B—Scratches sustained slightly with rubbing.
C—Scratches sustained even with weak rubbing.

Adhesiveness: This property was determined by the so-called cross-cut tape test, i.e., by cutting 11 parallel lines each in two perpendicularly crossing directions with a sharp razor blade. The lines are cut at fixed intervals of approximately 1 mm, on the surface of the coating of a given sample to produce a total of 100 squares, adhesive cellophane tape is applied to the cut squares, the tape is peeled, and the squares on which the coat film remains are counted. The adhesiveness is reported by the number of squares remaining.

Hot Water Resistance: This property was determined by placing a given sample in boiling water for one hour and examining the coating at the end of the period. The adhesiveness test was then administered with the cross-cut tape test.

Resistance to Photooxidation: The test entailed placing the samples under a General Electric or Sylvania sun lamp, 275 watts, at a distance of 24 cm. The samples were examined at set time intervals and tested for abrasion with steel wool #0000. The samples then were subjected to 10 minutes of tinting in a tint bath at 100° C. that contained BPI (Brain Power, Inc.) sun-gray dispersion dyes. The durability of the coating was recorded.

Wearing Trials: Selected subjects were provided with glasses coated with the selected coating compositions and the coating wearability was recorded.

Tintability: The coated lenses were placed in a boiling-water tint bath containing BPI sun-gray dispersion dyes, one flask per liter of water. The lens transmittances were recorded at specified intervals.

Impact Resistance: Coated and uncoated plano lenses were subjected to the impact of a 16.27 g steel ball dropped from a height of 52 inches (FDA test). Uncoated lenses do not break or crack under this test. Any defects that appeared on the coated lenses were recorded.

The following examples describe in detail the invention, but by no means limit the scope of it.

EXAMPLE I (1) Preparation of Coating Composition for Bottom Layer:

(a) Preparation of Silane Hydrolyzate:

In a round-bottom one-necked flask were placed 250 g of gamma-glycidoxypropyltrimethoxy silane (GPTS), 188 g of methyltrimethoxy silane (MTS) (ratio GPTS/MTS is 57/43 by weight) and 345 g of ethycellosolve. Then, in a period of 5 minutes, 220 ml of 0.01N HCl were added with strong stirring. The colorless and transparent solution was then distilled at atmospheric pressure in a rotavapor to obtain 330 g of distillate. (A rotavapor is a rotatory evaporator). The final solution contained 40% solids by weight based on the solid equivalent weight of the original amount of silane monomers.

(b) Preparation of Coating Composition:

To 568 g of the above-mentioned silane hydrolyzate were added 4600 g of ethylcellosolve (monoethylether of ethylene glycol), 450 g of colloidal silica in ethylcellosolve (30% solids, produced by Nalco), 196 g of a 20% solution of maleic acid (equivalent to 10% of maleic acid in cured coating) in ethylcellosolve, 22.5 g of a 10% aqueous solution of ammonium perchlorate, 5.5 g of aluminum acetylacetonate, 0.45 g of SF1188 silicon block copolymer (flow additive made by General Electric), and 0.30 g of a 40% solution in isopropanol of fluorosurfactant Zonyl FSN (DuPont).

(c) Coating and Curing:

Diethyleneglycol bisallylcarbonate polymer lenses (plano lenses CR-39, 70 mm in diameter and 2 mm in thickness), which had been dipped in an aqueous 35% potassium hydroxide solution at 40° C. with 0.08% fluorosurfactant Zonyl FSN for 60 seconds and then washed, were coated with the coating composition prepared in (1b) above, according to the spinning method at a speed of 1700 rpm for 50 seconds. The coated lenses were cured for 60 seconds by placing them 8 cm from a small heating station consisting of coils covering a circle 70 mm in diameter. The lenses were dry and non-tacky when touched with the fingers. However, with the omission of either ammonium perchlorate or aluminum acetylacetonate, the lenses were tacky under the same curing conditions. When the bottom layer was 1 micron or more in thickness, the lenses were not only tacky but slippery and wet. The lenses were postcured under either one of two nearly closely equivalent conditions. The first set of conditions included an air oven at 100° C. for 2 hours and the second set of conditions included short wavelength infrared rays for 20 minutes. The layer had a refractive index of 1.467 and a thickness of 114 nm. For this case and for all others described below, curves were plotted to show the relationship between layer thickness and spin speed.

(2) Preparation of Coating Composition for Middle Layer:

(a) Preparation of Silane Hydrolyzate:

In a reactor were placed 153.5 g of phenyltrimethoxysilane (PTS), 285.1 g of GPTS (ratio of PTS/GPTS is 35/65 by weight) and 384 g of cellosolve. Then, in a period of 5 minutes, 220 g of 0.01N HCl were added with strong stirring. Afterwards, 315 g of distillate were obtained at atmospheric pressure in a rotavapor. The final solution contained 41% solids by weight based on the solid equivalent weight.

(b) Preparation of Coating Composition (ratio of TPT/solid layer-forming components by equivalent weight=78/22):

To 181.7 g of the hydrolyzate mentioned in (2a) were added 6488 g of cellosolve, 260 g of TPT, 0.16 g of flow additive SF1188 and 0.40 g of a 40% solution of Zonyl FSN.

(c) Coating and Curing:

The coated lenses obtained in (1c) were spin-coated with the above mentioned formulation at 1700 rpm and subjected to the same curing processes mentioned in (1c). The layer had a refractive index of 1.669 and a thickness of 98 nm.

(3) Preparation of Coating Composition for Top Layer:

(a) Preparation of Silane Hydrolyzate:
The same as (1a).

(b) Preparation of Coating Composition:
The same as (1b), except that 20 g of a 40% solution of Zonyl FSN were added instead of 0.30 g.

(4) Coating and Curing:

The same thermal treatment indicated in (1c), except that the oven curing lasted 4 hours and the infrared curing lasted 20 minutes. The layer had the same refractive index and thickness as in (1c).

The coated lens had a golden-pink reflection and reflected only 3% of white light, whereas an uncoated lens reflected 8% of white light. The calculated wavelengths of interference in accordance with equations (1) thru (3) for $\theta=10°$ were 664 nm (top layer), 486 nm (middle layer), and 565 nm (bottom layer). FIG. 1 is a graph comparing the reflective photospectrum of an antireflective lens exhibiting a golden-pink reflected color. The cross-cut tape test before and after 1 hour boiling water treatment resulted in no squares being peeled off. No scratches were seen by steel-wool test either. Taber abrasion test gave haze values of 2.6, 8.0, 11, and 28 for 100, 200, 300, and 500 cycles, respectively. Uncoated CR-39 lens at the same cycles gave haze values of 11.8, 40, 63, and 63, respectively. Tinting for 50 minutes gave 16% transmittance, while with uncoated CR-39 lenses tinting gave 14.6% transmittance under the same conditions. The impact resistance test did not give any cracking or breaking of the coating or the lens. After 245 hours under the sun-lamp, the coating had no significant decrease of steel-wool abrasion, no crazing (that is, minute cracks on the surface), no significant fading in color of reflected light, and no loss of any coating off the lens surface if tinted for 10 minutes. The wearing trial did not show any peeling of the coating after 4 months of normal use.

COMPARATIVE EXAMPLE 1

Maleic acid and Zonyl FSN fluorosurfactant were omitted in top and bottom layers of Example 1. Otherwise the lenses were coated under identical conditions using the same layer thicknesses. The coating was of inferior cosmetic quality than the one in Example 1. Tintability after 50 minutes gave only 42% transmittance. The cross-cut tape test before and after 1 hour boiling water treatment resulted in no complete squares being peeled off, although very small sections of coating were missing at the edges of the lines. Coating reflection faded from red to yellow in 24 hours of exposure to the sun-lamp. After 137 hours of exposure, the lenses were tinted for 10 minutes and did not suffer any loss of coating. Steel-wool abrasion was not significantly changed after 137 hours of exposure to the sun-lamp.

COMPARATIVE EXAMPLE 2

Zonyl FSN fluorosurfactant was omitted in the three layers of Example 1. The cosmetic quality of the lenses was mediocre to poor when compared with coating of Example 1. After 245 hours under the sun-lamp, the golden-pink reflection had faded to a dull yellow, and about half of the exposed lenses crazed visibly with long crazes. Steel-wool abrasion was not affected and after a 10 minute tinting of the exposed lenses, no coating was lost.

COMPARATIVE EXAMPLE 3

Two-layer coatings were placed on CR-39 etched plano lenses. The bottom layer had the same formulation as the middle layer of Example 1. Spinning conditions, and curing were similar to the conditions given for Example 1. After 24 hours of sun-lamp exposure, the yellow-pink reflection had faded to yellow and after 48 hours, the steel-wool abrasion resistance had decreased noticeably. After 137 hours of exposure, there was no evidence of any steel-wool abrasion resistance and after a 10 minute tinting of these lenses, the coating lost about 30-50% of its surface. Wearing trials gave coating degradation and gross surface defects after 3 months of normal use.

COMPARATIVE EXAMPLE 4

The conditions of Comparative Example 3 were used, but maleic acid and Zonyl FSN were omitted. The results were similar to Comparative Example 3.

COMPARATIVE EXAMPLE 5

Following the procedure of (2a), a 47/53 ratio of PTS/GTPS siloxane was produced. Following the procedure and contents of Example 1, a three-layer coating was applied to etched CR-39 planos. The cross-cut tape test yielded poor results, in that 50 squares peeled off after being placed in boiling water. These results can be compared with Comparative Example 1. If maleic acid (15% by weight in cured layer) is incorporated in the top and bottom layers, the cross-cut tape test gave improved adhesion, with only 10 squares peeled off after being placed in boiling water.

COMPARATIVE EXAMPLE 6

Following the procedure of (2a) a 100% GPTS hydrolyzate was made and a coating composition ratio of 78/22 TPT/GPTS solid equivalent weight was made (procedure 2b). Then, a 3-layer coating was produced following the procedure in Example 1 and using its contents, with the exclusion of maleic acid and Zonyl FSN. The coated lenses had poor weatherability as a result. After 24 hours of exposure to the sun-lamp, the reflected light faded from deep red to yellow, and the steel-wool abrasion test showed weakening of abrasion resistance. If the top and the bottom layers contained GPTS hydrolyzate instead of 57/43 GPTS/MTS, the loss of abrasion resistance was even greater under exposure to the sun-lamp, although intact lenses had 100/100 after boiling-water test. Two-layer coatings experienced poorer results than three-layer coatings with the weatherability test.

COMPARATIVE EXAMPLE 7

CR-39 lenses were coated following the procedure and using the Example 1, except that the lenses were not etched with caustic solution, adhesion of the coating to a CR-39 substrate was very poor even before running the boiling-water test.

EXAMPLE 2

(1) Preparation of Coating Composition for Bottom Layer:

The procedure listed in Example 1, sections (1a), (1b), and (1c) were followed, except that in (1c) maleic acid was omitted and the spinning speed was 2500 instead of 1700 rpm. The coating was 84 nm-thick.

(2) Preparation of Coating Composition for Middle Layer:

(a) Preparation of a 100% TPT solution:

30 g of TPT were added to 970 g of ethylcellosolve and 0.006 g of a 40% solution of Zonyl FSN.

(b) Coating

The coated lenses obtained above were coated with the above 100% TPT solution at 15° C. and spun at 1200 rpm for 50 seconds, cured as described in section (1c), and postcured in an air oven for 2 hours or alternatively, under short wavelength infrared rays for 10 minutes. The coating had a refractive index of 1.880 and a thickness of 100 nm.

(3) Preparation of Coating Composition for Top Layer:

The composition was identical to the one described in Example 1, section 3, except that maleic acid was omitted.

(4) Coating and Curing:

The lenses obtained in section (2b) above were coated and spun at 2000 rpm, followed by the same thermal treatment indicated in Example 1, section 4. The coating had a thickness of 112 nm and a refractive index of 1.467. The calculated wavelengths of interference in accordance with equations (1) thru (3) for $\theta = 10°$ were 650 nm (top layer), 550 nm (middle layer), and 460 nm (bottom layer). FIG. 2 is a graph comparing the reflective photospectrum of an uncoated lens and an antireflective coated lens exhibiting a purple-pink reflected color. The coated lens reflected only 2% of white light, whereas an uncoated lens reflected 8% of white light. The cross-cut tape test before and after 1 hour boiling water treatment resulted in no squares being peeled off. A fifty minute tinting gave 80% transmittance, while uncoated CR-39 lenses gave 14.6% transmittance. Steel-wool abrasion test resulted in no visible scratches. Taber abrasion test gave haze values of 5.9, 8.2, 19, and 49, at 100, 200, 300, and 500 cycles respectively, while uncoated CR-39 gave haze values of 11.8, 40, 63, and 63, respectively. After 92 hours under the sun-lamp, the coating faded slightly, but the steel-wool abrasion resistance was similar to the intact lenses. Ten-minute tinting of exposed lenses did not result in any loss of coating from the lenses.

COMPARATIVE EXAMPLE 8

Following Example 2, a two-layer coating was placed on etched CR-39 lenses. The bottom coating layer was composed of 100% titanium dioxide as described in Example 2, sections (2a) and (2b). The top layer was of the same composition as the top layer of Example 2, section 3. The lenses were tinted for 50 minutes. After tinting, the coating showed streaks underneath it, indicating that the dye had penetrated underneath the coating. This was caused by the poor adhesion between the titanium dioxide layer and the CR-39 substrate. Intact lenses after 24 hours under the sun-lamp showed a significant weakening of abrasion resistance under the steel-wool test, although the reflection color did not fade significantly. Ten minute tinting of lenses exposed for 50 hours under the sun-lamp caused the entire coating to be lost. The presence of only maleic acid and Zonyl FSN increased the tintability of the intact coated lenses considerably, but did not improve significantly the poor weatherability of the two-layer coating.

COMPARATIVE EXAMPLE 9

When the two-layer coating of Comparative Example 8 was placed on unetched CR-39 lenses, the poor weatherability was comparable to the previous Comparative Example 8.

What is claimed is:

1. A three-layer antireflective coating composition stacked on a substrate, comprising a middle layer containing titanium compound sandwiched between top and bottom layers containing polysiloxane, wherein the top and bottom layers are titanium free.

2. A three-layer antireflective coating composition in accordance with claim 1, wherein said substrate is allyl diglycol carbonate polymer (CR-39).

3. A three-layer antireflective coating composition in accordance with claim 1, wherein said substrate is glass.

4. A three-layer antireflective coating composition in accordance with claim 1, wherein the composition of said top layer comprises:
   (a) a polysiloxane formed from a mixture of:
      (i) an oxygenated (epoxy-and-ether-containing groups) gamma-glycidoxypropyltrialkoxy silane monomer comprising from about 45-70% by weight of the silane monomer mixture;
      (ii) an alkyltrialkoxysilane monomer comprising from about 30-55% by weight of the silane monomer mixture;
   (b) at least one fluorosurfactant comprising from about 0.001-4.0% by weight based on the weight of the cured coating layer-forming components.

5. A three-layer antireflective coating composition in accordance with claim 4, wherein said gamma-glycidoxypropyltrialkoxy silane monomer comprises from about 52-62% by weight gamma-glycidoxypropyltrimethoxy silane.

6. A three-layer antireflective coating composition in accordance with claim 4, wherein said alkyltrialkoxysilane monomer comprisees from about 38-48% by weight methyltrimethoxysilane.

7. A three-layer antireflective coating composition in accordance with claim 4, wherein at least one said fluorosurfactant comprises from about 1.5-2.49% by weight based on the weight of the cured coating layer-forming components.

8. A three-layer antireflective coating composition in accordance with claim 1, wherein said middle layer comprises a mixture of:
   (a) organic titanium compound comprising from about 1-99.8% by weight based on the weight of the organic titanium compound/polymer mixture (polysiloxane);
   (b) polysiloxane comprising from about 0.2-99% by weight based on the weight of the organic titanium compound/polymer mixture (polysiloxane). The polysiloxane is formed from a mixture of:
      (i) a phenyltrialkoxysilane monomer comprising from about 20-60% by weight of the silane monomer mixture;
      (ii) a gamma-glycidoxypropyltrialkoxysilane monomer comprising from about 40-80% by weight of the silane monomer mixture;
   (c) at least one fluorosurfactant comprising from about 0.03-0.55% by weight based on the weight of the cured coating layer-forming components.

9. A three-layer antireflective coating composition in accordance with claim 8, wherein said organic titanium compound comprises from about 50-99.8% by weight of titanates selected from the group consisting of tetraisopropyl titanate (TPT) and tetraethoxytitanate (TET).

10. A three-layer antireflective coating composition in accordance with claim 9, wherein said titanium compound comprises from about 50-90% by weight of tetraisopropyl titanate (TPT).

11. A three-layer antireflective coating composition in accordance with claim 9, wherein said titanium compound comprises from about 50-90% by weight of tetraethoxytitanate (TET).

12. A three-layer antireflective coating composition in accordance with claim 8, wherein said phenyltrialkoxysilane monomer comprises from about 30-40% by weight of phenyltrimethoxysilane.

13. A three-layer antireflective coating composition in accordance with claim 8, wherein said gamma-glycidoxypropyltrialkoxysilane monomer comprises from abut 60-70% by weight gamma-glycidoxypropyltrimethoxysilane.

14. A three-layer antireflective coating composition in accordance with claim 8, wherein at least one said fluorosurfactant comprises from about 0.03-0.08% by weight based on the weight of the cured coating layer-forming components.

15. A three-layer antireflective coating composition in accordance with claim 1, wherein the composition of said bottom layer (adjacent to substrate) comprises:
   (a) a polysiloxane formed from a mixture of:
      (i) a gamma-glycidoxypropyltrialkoxy silane monomer comprising from about 45-70% by weight of the silane monomer mixture;
      (ii) an alkyltrialkoxysilane monomer comprising from about 30-55% by weight of the silane monomer mixture;
   (b) at least one fluorosurfactant comprising from about 0.0015-0.090% by weight based on the weight of the cured coating layer-forming components.

16. A three-layer antireflective coating composition in accordance with claim 15, wherein said gamma-glycidoxypropyltrialkoxy silane monomer comprises from about 52-62% gamma-glycidoxypropyltrimethoxy silane.

17. A three-layer antireflective coating composition in accordance with claim 15, wherein said alkyltrialkoxysilane monomer comprises from about 38-48% methyltrimethoxysilane.

18. A three-layer antireflective coating composition in accordance with claim 15, wherein at least one said fluorosurfactant comprises from about 0.022-0.044% by weight based on the weight of the cured coating layer-forming components.

19. A allyl diglycol carbonate polymer (CR-39) or glass substrate having a three-layer antireflective coating composition comprising a middle coating layer containing titanium compound sandwiched between top and bottom coating layers containing polysiloxane, wherein the top and bottom layers are titanium-free; the thicknesses of each of said coating layers being in accordance with preselected equations and, wherein the refractive indices of said coating layers satisfy the following requirements:

$$n_m > n_b$$

$$n_m > n_t$$

where $n_m$ represents the refractive index of said middle layer, $n_b$ represents the refractive index of said bottom layer, and $n_t$ represents the refractive index of said top layer.

20. A substrate having an antireflective coating composition in accordance with claim 19, wherein the refractive index of said bottom layer adjacent to said substrate and the refractive index of said substrate satisfies the following requirement:

$$n_b \leq n_s$$

where $n_b$ represents the refractive index of said bottom layer, and $n_s$ represents the refractive index of said substrate.

21. A substrate having an antireflective coating composition in accordance with claim 19, wherein the refractive indices of said coating layers and the refractive index of said substrate satisfy the following requirements:

$$n_m > n_s > n_b \geq n_t$$

wherein $n_m$ represents the refractive index of said middle layer, $n_s$ represents the refractive index of said substrate, $n_t$ represents the refractive index of said bottom layer, and $n_t$ represents the refractive index of said top layer.

22. A substrate having an antireflective coating composition in accordance with claim 19, wherein the thickness of said top coating layer is determined by an equation satisfying the following requirements:

$$\delta_t = \frac{L \cdot \lambda_a}{4 n_a (n_t^2 - \sin^2\theta)^{\frac{1}{2}}}$$

wherein $\delta$ represents thickness in nanometers, $\lambda$ represents wavelength in air for oncoming light (in nanometers), $\theta$ represents angle of incidence, n represents the refractive index, and L represents an odd positive integer.

23. A substrate having an antireflective coating composition in accordance with claim 19, wherein the thickness of said middle coating layer is determined by an equation satisfying the following requirements:

$$\delta_m = \frac{M \cdot \lambda_a}{2 n_t (n_m^2 - \sin^2\theta)^{\frac{1}{2}}}$$

wherein $\delta$ represents thickness in nanometers, $\lambda$ represents wavelength in air for oncoming light (in nanometers), $\theta$ represents angle of incidence, n represents the refractive index, and M represents any positive integer.

24. A substrate having an antireflective coating composition in accordance with claim 19, wherein the thickness of said bottom coating layer is determined by an equation satisfying the following requirements:

$$\delta_b = \frac{M \cdot \lambda_a}{2 n_m (n_b^2 - \sin^2\theta)^{\frac{1}{2}}}$$

wherein $\delta$ represents thickness in nanometers, $\lambda$ represents wavelength in air for oncoming light (in nanometers), $\theta$ represents angle of incidence, n represents the refractive index, and M represents any positive integer.

* * * * *